Aug. 25, 1942.  M. A. DAVIS  2,293,888
SAW CLAMP
Filed Jan. 6, 1942  2 Sheets-Sheet 1
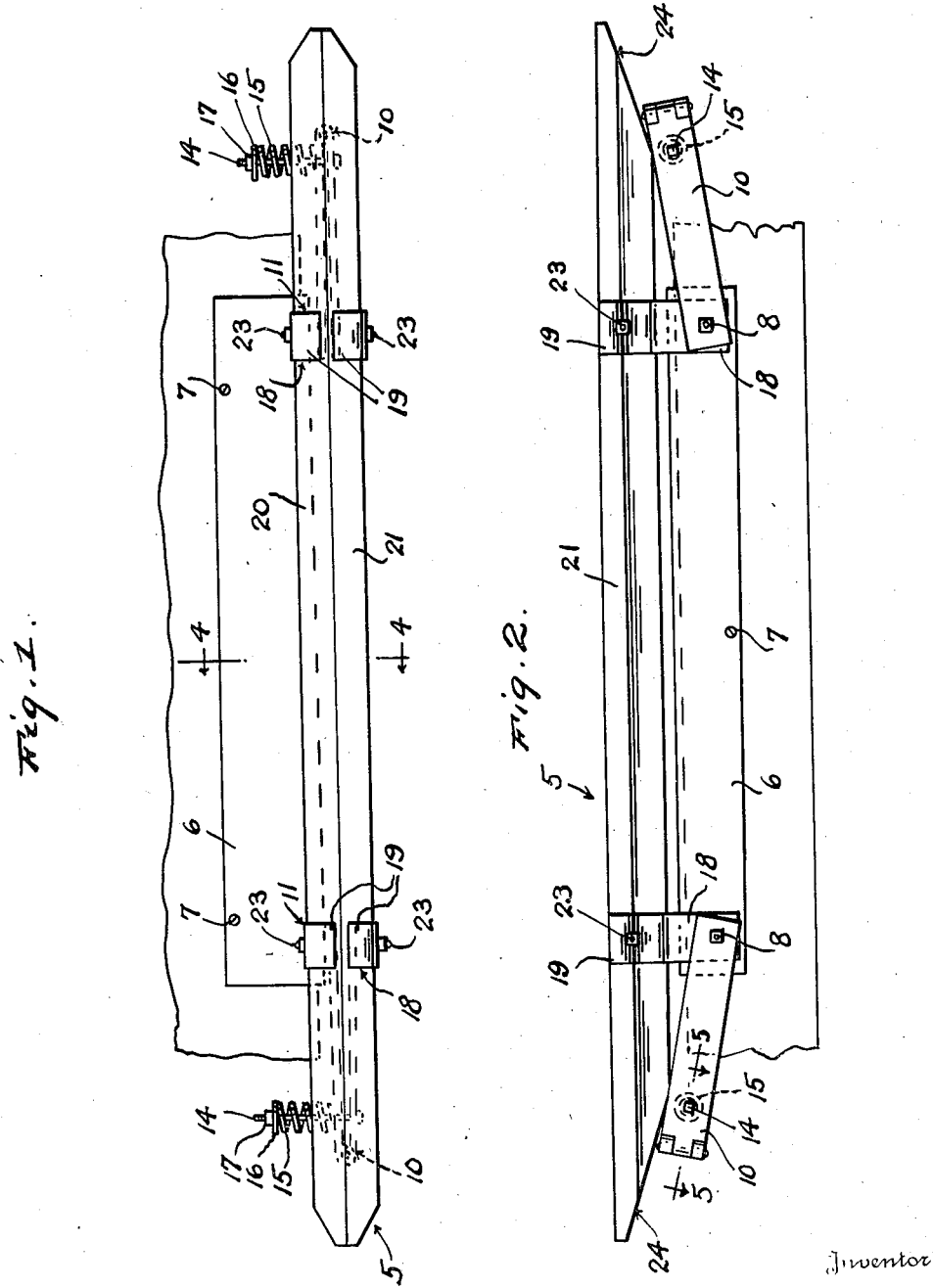
Inventor
Marion A. Davis
By L. B. James
Attorney Aug. 25, 1942. M. A. DAVIS 2,293,888
SAW CLAMP
Filed Jan. 6, 1942 2 Sheets-Sheet 2
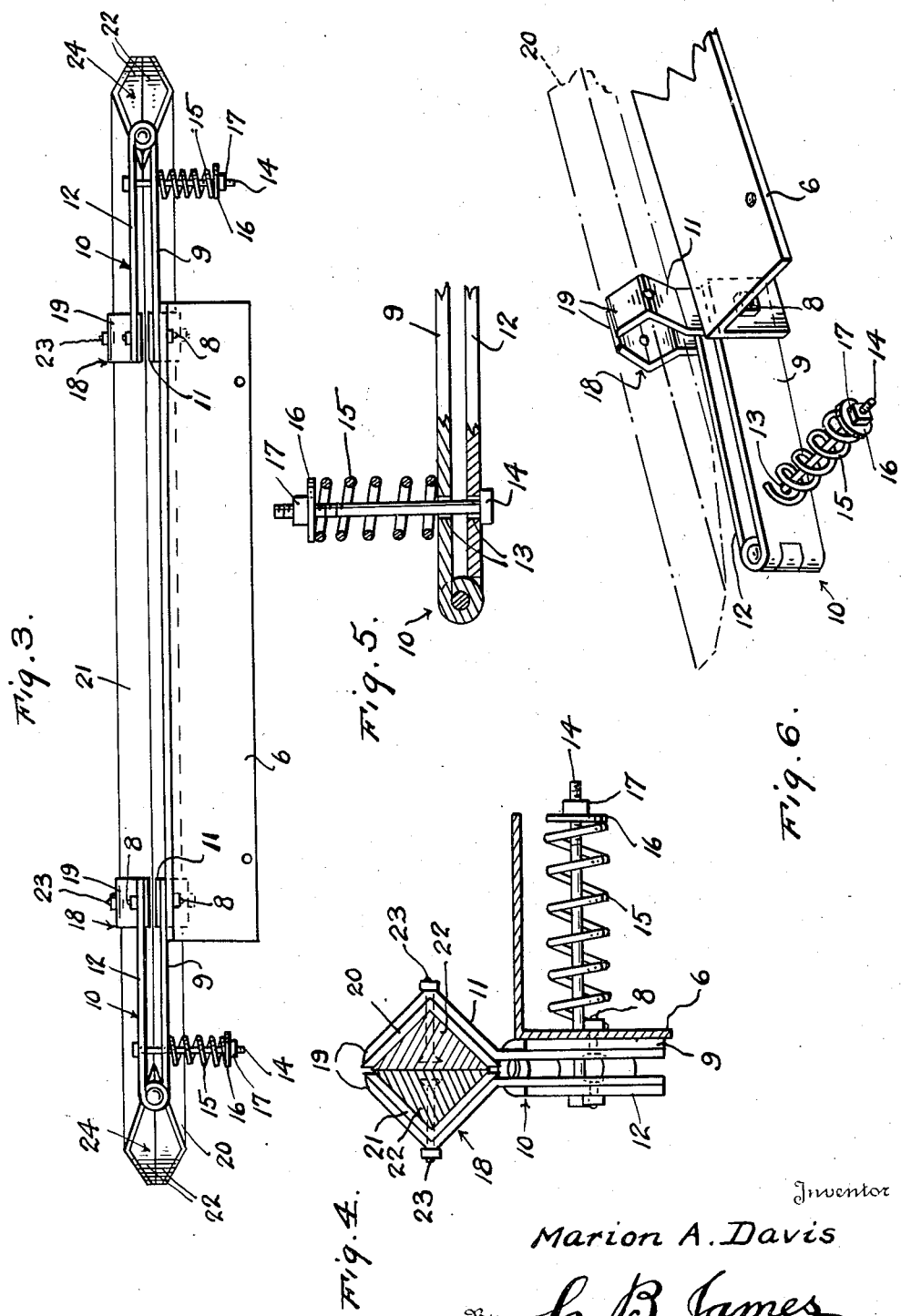
Inventor
Marion A. Davis
By L. B. James
Attorney Patented Aug. 25, 1942

2,293,888

UNITED STATES PATENT OFFICE 2,293,888

SAW CLAMP

Marion Abner Davis, Los Angeles, Calif., assignor of one-half to Robert Thomas Lyttle, Sr., Pasadena, Calif.

Application January 6, 1942, Serial No. 425,801

1 Claim. (Cl. 76—78)

This invention relates to the official class of tools and more particularly saw clamps.

The primary object of this invention resides in the provision of a saw clamp adapted to rigidly retain a saw therein without the use of the usual levers.

Another object of this invention resides in the provision of a saw clamp adapted to rigidly retain a saw therein so it can be filed in considerably less time than with other well known saw clamps.

A further object of this invention resides in the provision of a saw clamp producing no vibration during the filing operation upon the saw held thereby.

A still further object of this invention resides in the provision of a saw clamp having wood or similar gripping jaws adapted to prevent a saw retained therebetween from slipping.

Aside from the aforesaid objects this invention resides in the provision of a saw clamp adapted to automatically grip a saw placed therein.

With these and other objects in view this invention resides in certain novel features of construction and arrangement of elements to be hereinafter more particularly set forth in the specification, illustrated in the accompanying drawings and pointed out in the appended claim and, while the present disclosure depicts my conception of the invention, the right is reserved to resort to such changes in construction and arrangement of elements as come within the spirit of the invention.

In the accompanying drawings forming a part of this application:

Fig. 1 is a plan view of the saw clamp supported by a bench or other suitable support.

Fig. 2 is a front view thereof.

Fig. 3 is a bottom view thereof.

Fig. 4 is an enlarged sectional view approximately on line 4—4 of Fig. 1.

Fig. 5 is an enlarged sectional view approximately on line 5—5 of Fig. 2.

Fig. 6 is a detail perspective view of a portion of the saw clamp showing one of the hinges.

In the present illustration of this invention the numeral 5 designates, in general, a saw clamp comprising an apertured angle iron base 6 adapted to be secured on the edge of a bench or other suitable support by screws 7 or other suitable fastening elements.

Rigidly secured to the opposite ends of the base, as by bolts 8, are the inner or fixed leaves 9 of elongated hinges 10 and stationary standards or brackets 11, said fixed leaves and swingable leaves 12 of the hinges are provided with aligned apertures 13 accommodating elongated bolts 14 surrounded by expansion coil springs 15 held against the stationary leaves of the hinges by washers 16 and nuts 17 so as to draw the swingable leaves 12 toward the stationary leaves.

Secured to the free ends of the swingable leaves of the hinges, preferably in opposed relation to the stationary standards 11 are other standards or brackets 18 similar to the first mentioned standards, said standards have their free end portions 19 of angular configuration to support opposed elongated clamping heads 20 and 21 also of angular configuration.

Carried by the angular heads 20 and 21 in opposed relation to one another are gripping jaws 22 preferably formed of wood or the like, the same being secured to the heads by bolts 23 which in turn fasten the heads to the standards.

The lower ends of the heads and jaws are beveled as indicated by the numeral 24 to permit the full grip on saw blades inserted therebetween.

With a saw clamp constructed as aforesaid that clamping head and gripping jaw carried by the swingable leaves of the hinges are forced away from the stationary clamping head and gripping jaw, thereby compressing the coil springs 15 whereupon the saw is inserted between the gripping jaws which when released retain it in rigid position therebetween under the influence of the coil spring.

Through the instrumentality of the cooperating elements embodied in this invention, it is manifest that a saw clamp is provided which is positive in operation and with which time in filing saws is considerably reduced thus placing it within the category of devices producing profit through its use.

Having thus described my invention what I claim and desire to protect by Letters Patent is:

A saw clamp comprising a base, elongated leaf hinges including stationary and swingable leaves extending from the opposite ends of the base, fastening means simultaneously securing one leaf of each hinge and the stationary standards to the base, standards secured to the swingable leaves of the hinges in opposed relation to the stationary standards, elongated clamping heads carried by the standards, elongated gripping jaws carried by the heads in opposed relation, elongated bolts passing through the leaves of the springs, coil springs surrounding the bolts and bearing at their inner ends against the stationary leaves of the hinges, washers on the bolts and bearing against the opposite ends of the springs and nuts threadedly disposed on the free ends of the bolts and bearing against the washers.

MARION ABNER DAVIS.